(12) United States Patent
Tranninger et al.

(10) Patent No.: US 10,435,551 B2
(45) Date of Patent: *Oct. 8, 2019

(54) SCRATCH RESISTANCE POLYPROPYLENE AT HIGH FLOW

(71) Applicant: Borealis AG, Vienna (AT)

(72) Inventors: Cornelia Tranninger, Pucking (AT); Stefan Schiesser, Linz (AT); Balakantha rao Kona, Abu Dhabi (AE); Andreas Hauer, Kirchschlag (AT)

(73) Assignee: Borealis AG, Vienna (AT)

( * ) Notice: Subject to any disclaimer, the term of this patent is extended or adjusted under 35 U.S.C. 154(b) by 526 days.

This patent is subject to a terminal disclaimer.

(21) Appl. No.: 14/375,560

(22) PCT Filed: Jan. 31, 2013

(86) PCT No.: PCT/EP2013/051897
§ 371 (c)(1),
(2) Date: Jul. 30, 2014

(87) PCT Pub. No.: WO2013/113814
PCT Pub. Date: Aug. 8, 2013

(65) Prior Publication Data
US 2015/0017366 A1   Jan. 15, 2015

(30) Foreign Application Priority Data
Feb. 3, 2012   (EP) .................... 12153859

(51) Int. Cl.
*C08L 23/12* (2006.01)
*C08L 23/16* (2006.01)
*C08F 210/06* (2006.01)

(52) U.S. Cl.
CPC ............ *C08L 23/12* (2013.01); *C08F 210/06* (2013.01); *C08L 23/16* (2013.01); *C08L 2205/025* (2013.01); *C08L 2205/035* (2013.01); *C08L 2207/02* (2013.01); *C08L 2308/00* (2013.01); *C08L 2314/02* (2013.01); *Y10T 428/1397* (2015.01)

(58) Field of Classification Search
CPC .... C08F 10/00; C08F 2500/12; C08F 210/16; C08F 2500/17; C08F 2500/05; C08F 2500/21; C08F 4/027; C08L 2666/06; C08L 23/12; C08L 23/10; C08L 23/14; C08L 23/16; C08L 2308/00; C08L 2205/025; C08L 2205/03; C08L 2205/035; C08L 2207/02
USPC ......... 525/240, 232, 191; 524/240, 397, 525
See application file for complete search history.

(56) References Cited

U.S. PATENT DOCUMENTS

| | | | | |
|---|---|---|---|---|
| 6,503,993 B1 * | 1/2003 | Huovinen | ............... | C08F 10/06 526/348.1 |
| 8,207,272 B2 * | 6/2012 | Bernreitner | ......... | C08L 23/0815 525/240 |
| 8,822,602 B2 * | 9/2014 | Leskinen | ................ | C08F 10/06 525/199 |
| 9,416,262 B2 * | 8/2016 | Kock | .................. | C08F 297/086 |
| 2003/0176603 A1 * | 9/2003 | Ommundsen | ......... | C08F 210/16 526/90 |
| 2011/0201758 A1 * | 8/2011 | Bernreitner | ......... | C08L 23/0815 525/240 |
| 2011/0288213 A1 * | 11/2011 | Bergstra | .................. | C08F 10/06 524/108 |
| 2013/0281630 A1 * | 10/2013 | Leskinen | ................ | C08F 10/06 525/240 |

FOREIGN PATENT DOCUMENTS

| | | | | |
|---|---|---|---|---|
| CN | 102203178 A | 9/2011 | | |
| CN | 102272166 A | 12/2011 | | |
| CN | 103154122 A | 6/2013 | | |
| CN | 103201339 A | 7/2013 | | |
| EP | 0 491 566 A2 | 6/1992 | | |
| EP | 0 586 390 A1 | 3/1994 | | |
| EP | 0 591 224 A1 | 4/1994 | | |
| EP | 0 887 379 A1 | 12/1998 | | |
| EP | 1 028 984 A1 | 8/2000 | | |
| EP | 1 183 307 A1 | 3/2002 | | |
| EP | 2 182 030 A1 | 5/2010 | | |
| EP | 2368937 A1 * | 9/2011 | ............. | C08L 23/10 |
| EP | 2 386 602 A1 | 11/2011 | | |
| EP | 2 397 517 A1 | 12/2011 | | |
| EP | 2 415 831 A1 | 2/2012 | | |
| WO | 87/07620 A1 | 12/1987 | | |
| WO | 92/12182 A1 | 7/1992 | | |
| WO | 92/19653 A1 | 11/1992 | | |
| WO | 92/19658 A1 | 11/1992 | | |
| WO | 99/24478 A1 | 5/1999 | | |
| WO | 99/24479 A1 | 5/1999 | | |
| WO | 00/68315 A1 | 11/2000 | | |
| WO | 2004/000899 A1 | 12/2003 | | |
| WO | 2004/111095 A1 | 12/2004 | | |
| WO | 2011/144705 A1 | 11/2011 | | |

OTHER PUBLICATIONS

Kutz, Myer. (2011). Applied Plastics Engineering Handbook—Processing and Materials—3.2 Classes of Polyolefins. Elsevier. Online version available at: http://app.knovel.com/hotlink/pdf/id:kt0098QI48/applied-plastics-engineering/classes-polyolefins.*

(Continued)

*Primary Examiner* — Scott R. Walshon
*Assistant Examiner* — Julius Fitzhugh
(74) *Attorney, Agent, or Firm* — Warn Partners, P.C.

(57) ABSTRACT

Injection molded article comprising at least 60 wt.-% of a heterophasic propylene copolymer, said polymer comprises a matrix being a polypropylene, said polypropylene comprises at least three polypropylene fractions, the three polypropylene fractions differ from each other by the melt flow rate and at least one of the three polypropylene fractions has a melt flow rate in the range of 1.0 to 20.0 g/10 min, and an elastomeric propylene copolymer dispersed in said matrix, wherein said heterophasic propylene copolymer has a melt flow rate of equal or more than 20.0 g/10 min and the amorphous phase of the xylene cold soluble fraction of the heterophasic propylene copolymer has an intrinsic viscosity of equal or higher than 2.0 dl/g.

11 Claims, No Drawings

(56) References Cited

OTHER PUBLICATIONS

R. Chujo, Y. Kogure and T. Vaananen, Two-site model analysis of 13C n.m.r. of polypropylene polymerized by Ziegler-Natta catalyst with external alkoxysilane donors, 1994, vol. 35, No. 2, Butterworth-Heinemann Ltd.

T. Hayashi, Y. Inoue, R. Chujo and T. Asakura, Heptad configurational analysis of 13C n.m.r. spectra in highly isotactic polypropylene, 1988, vol. 29, Butterworth & Co. Ltd.

T. Koch and D. Machl, Evaluation of scratch resistance in multiphase PP blends, 2007, vol. 26, 927-936, Elsevier Ltd.

N. Pasquini (Ed.), Polypropylene Handbook, 2nd Edition, Hanser.

Federal Registration, Title 21, Chapter 1, Part 177, Section 1520, s. Annex B.

International Search Report for International Application No. PCT/EP2013/051897, Filed Jan. 31, 2013.

\* cited by examiner

SCRATCH RESISTANCE POLYPROPYLENE AT HIGH FLOW

CROSS REFERENCE TO RELATED APPLICATIONS

This application is a National Stage of International Application No. PCT/EP2013/051897, filed Jan. 31, 2013. This application claims priority to European Patent Application No. EP 12153859.9 filed on Feb. 3, 2012. The disclosures of the above applications are incorporated herein by reference.

The present invention is directed to new injection molded articles with improved scratch resistance and to the use of a heterophasic propylene copolymer (HECO) for the improvement of scratch visibility of injection molded articles.

Heterophasic propylene copolymers are well known in the art. Such heterophasic propylene copolymers comprise a matrix being either a propylene homopolymer or a random propylene copolymer in which an elastomeric copolymer is dispersed. Thus the polypropylene matrix contains (finely) dispersed inclusions being not part of the matrix and said inclusions contain the elastomeric copolymer. The term inclusion indicates that the matrix and the inclusion form different phases within the heterophasic propylene copolymer, said inclusions are for instance visible by high resolution microscopy, like electron microscopy or atomic force microscopy, or by dynamic mechanical thermal analysis (DMTA).

One application of the heterophasic propylene copolymers is its use in injection molding processes. In this market segment down-gauging and light-weighing is a recurring market need, since it allows for energy and material savings. In order to provide a material equipped with these features, a high stiff material with good impact properties needs to be developed. The high stiffness enables lower wall thicknesses. Furthermore, a cycle time reduction is possible since a certain stiffness needed for demoulding of the specimen is reached at shorter cooling times. However, the impact performance which determines application performance, like drop height, needs to stay on a high level. Additionally, the materials should show high flowability otherwise injection molding of specimen with thin wall thickness is not possible. High flow materials, generally show high stiffness due to shorter polymer chains which have less stereo-defects. However, the impact performance becomes reduced due to shorter polymer chains which form less entanglements. A further challenge in this segment is the resistance against scratches. In other words there is the desire that the material show in addition to the other required properties high scratch resistance.

Thus, the object of the present invention is to obtain a material of high flowability, high stiffness, good impact performance and especially high scratch resistance.

The finding of the present invention is that an injection molded article with high scratch resistance is achievable when using a heterophasic propylene copolymer comprising a polypropylene matrix with three different polypropylene fractions, wherein said three polypropylene fractions differ in the melt flow rate $MFR_2$ (230° C.) and preferably one of said polypropylene fractions has a melt flow rate $MFR_2$ (230° C.) measured according to ISO 1133 of equal or below 20 g/10 min, wherein further the elastomeric propylene copolymer has a rather high intrinsic viscosity, i.e. the amorphous phase (AM) of the xylene cold soluble fraction (XCS) of the heterophasic propylene copolymer has an intrinsic viscosity (IV) measured according to ISO 1628-1 (at 135° C. in decaline) of at least 2.0 dl/g.

Accordingly the present invention is directed to an injection molded article comprising at least 60 wt.-% of a heterophasic propylene copolymer (HECO), said heterophasic propylene copolymer (HECO) comprises (a) a matrix (M) being a polypropylene (PP), said polypropylene (PP) comprises at least three polypropylene fractions (PP1), (PP2) and (PP3), the three polypropylene fractions (PP1), (PP2) and (PP3) differ from each other by the melt flow rate $MFR_2$ (230° C.) measured according to ISO 1133 and at least one of the three polypropylene fractions (PP1), (PP2) and (PP3) has a melt flow rate $MFR_2$ (230° C.) measured according to ISO 1133 in the range of 1.0 to equal or below 20.0 g/10 min, and (b) an elastomeric propylene copolymer (EC) dispersed in said matrix (M), wherein (i) said heterophasic propylene copolymer (HECO) has a melt flow rate $MFR_2$ (230° C.) measured according to ISO 1133 of equal or more than 20.0 g/10 min, and (ii) the amorphous phase (AM) of the xylene cold soluble fraction (XCS) of the heterophasic propylene copolymer (HECO) has an intrinsic viscosity (IV) measured according to ISO 1628-1 (at 135° C. in decaline) of equal or higher than 2.0 dl/g.

Preferably the polypropylene (PP) is a random propylene copolymer (R-PP) or a propylene homopolymer (H-PP), the latter being preferred. Even more preferred the polypropylene (PP) comprises as polymer components the three polypropylene fractions (PP1), (PP2) and (PP3) only.

It has surprisingly found that an injection molded article in which the heterophasic propylene copolymer (HECO) is the main component is featured by very good stiffness/impact balance and especially by good scratch resistance. (see examples).

Accordingly the present invention is also directed the use of a heterophasic propylene copolymer (HECO) to improve the scratch visibility of injection molded articles, said heterophasic propylene copolymer (HECO) comprises (a) a matrix (M) being a polypropylene (PP), said polypropylene (PP) comprises at least three polypropylene fractions (PP1), (PP2) and (PP3), the three polypropylene fractions (PP1), (PP2) and (PP3) differ from each other by the melt flow rate $MFR_2$ (230° C.) measured according to ISO 1133 and preferably at least one of the three polypropylene fractions (PP1), (PP2) and (PP3) has a melt flow rate $MFR_2$ (230° C.) measured according to ISO 1133 in the range of 1.0 to equal or below 20.0 g/10 min, and (b) an elastomeric propylene copolymer (EC) dispersed in said matrix (M), wherein (i) said heterophasic propylene copolymer (HECO) has a melt flow rate $MFR_2$ (230° C.) measured according to ISO 1133 of equal or more than 20.0 g/10 min, and (ii) the amorphous phase (AM) of the xylene cold soluble fraction (XCS) of the heterophasic propylene copolymer (HECO) has an intrinsic viscosity (IV) measured according to ISO 1628-1 (at 135° C. in decaline) of equal or higher than 2.0 dl/g, wherein the improvement of the scratch visibility is measured on moulded plaques of 150×80×2 $mm^3$ size having a high gloss surface on which scratches were applied at a force of 10 N, the scratch visibility is reported as the difference of the luminance ΔL of the unscratched from the scratched areas.

Preferably the heterophasic propylene copolymer (HECO) is used in an amount of at least 60 wt.-% in the injection molded article.

In the following the invention is described in more detail.

The amount of the heterophasic propylene copolymer (HECO) in the injection molded article is at least 60 wt.-%, more preferably at least 70 wt.-%, still more preferably at least 90 wt.-%, yet more preferably at least 95 wt.-%, like 95 to 100 wt.-%. It is especially preferred that the heterophasic propylene copolymer (HECO) is the only polymer in the injection molded article. Accordingly, in an especially preferred embodiment the instant injection molded article consists of the heterophasic propylene copolymer (HECO).

More preferably the injection molded article according to this invention is a housing or a pail. In one specific embodiment the injection molded article is a housing for personal care products or a housing for household appliances, the latter is especially preferred. Typically the injection molded article according to this invention is a housing for a member selected from the group consisting of vacuum cleaner, coffee machine, iron, steam iron, kettle, mixer, egg-boiler, toaster, juicer, kitchen-aid, blender, water heater, tea maker, ice machine, rice cooker, pop-corn-maker, food-dehydrator, water-dispenser, soda-maker, yoghurt-maker, ventilator, microwave oven, power tool, foot massage apparatus, shaver, epilator, device for dental hygiene, fever thermometer, motor housing, consumer electronic, air-conditioning-device, air purifier, humidifier and dehumidifier.

Accordingly the injection moulded article is preferably a housing or a pail, like a housing for personal care products or a housing for household appliances, especially those as listed in the previous paragraph, having a wall thickness of not more than 5 mm, more preferably of 0.5 to 5 mm, yet more preferably of 0.7 to 4 mm, still more preferably 0.9 to 3 mm, still yet more preferably 1.0 to 2.5 mm, like 1.0 to 2.0 mm.

The injection molded article is preferably featured by a rather high melt flow rate. Accordingly, it is preferred that the instant injection molded article has a melt flow rate $MFR_2$ (230° C.) of equal or more than 20 g/10 min, more preferably of equal or more than 25.0 g/10 min, still more preferably in the range of 25.0 to 200.0 g/10 min, yet more preferably in the range of 25.0 to 180 g/10 min, like in the range of 30.0 to 150 g/10 min.

It is also preferred that the injection molded article is thermomechanically stable. Accordingly it is appreciated that the injection molded article has a melting temperature of at least 160° C., more preferably of at least 162° C., still more preferably in the range of 163 to 170° C.

The xylene cold soluble (XCS) fraction measured according to ISO6427 (23° C.) of the injection molded article is preferably below 20.0 wt.-%, more preferably in the range of 5.0 to 20.0 wt.-%, like in the range of 9.0 to 18.0 wt.-%.

In one preferred embodiment the injection molded article and/or the heterophasic propylene copolymer (HECO) is/are featured by a high stiffness, good impact performance and good scratch resistance.

Accordingly it is preferred that the injection molded article and/or the heterophasic propylene copolymer (HECO) has a tensile modulus measured according to ISO 527-2 of at least 1500 MPa, more preferably of at least 1600 MPa, like of at least 1680 MPa, still more preferably in the range of 1500 to 3000 MPa, yet more preferably 1600 to 2500 MPa, like in the range of 1680 to 2500 MPa.

Alternatively or additionally to the stiffness, the injection molded article and/or the heterophasic propylene copolymer (HECO) has (a) an impact strength determined according to ISO 179/1 eA at 23° C. of at least 3.0 kJ/m$^2$, more preferably of at least 4.0 kJ/m$^2$, still more preferably in the range of 3.0 to 50.0 kJ/m$^2$, yet more preferably in the range of 4.0 to 15.0 kJ/m$^2$, and/or (b) an impact strength determined according to ISO 179/1 eA at −20° C. of at least 2.0 kJ/m$^2$, more preferably of at least 2.5 kJ/m$^2$, still more preferably in the range of 2.0 to 15.0 kJ/m$^2$, yet more preferably in the range of 2.5 to 10.0 kJ/m$^2$, Alternatively or additionally to the stiffness and or the impact performance, the injection molded article and/or the heterophasic propylene copolymer (HECO) has scratch visibility measured on moulded plaques of 150×80×2 mm$^3$ size having a high gloss surface on which scratches were applied at a force of 10 N, the scratch visibility is reported as the difference of the luminance ΔL of the unscratched from the scratched areas, of not more than 0.6, more preferably of not more than 0.5, still more preferably of 0.1 to 0.6, yet more preferably of 0.2 to 0.5, like 0.3 to 0.5, the values are absolute values.

Finally injection molded article and/or the heterophasic propylene copolymer (HECO) is/are additionally featured either by the heat resistance (Vicat B) or hexane solubles. Accordingly the injection molded article and/or the heterophasic propylene copolymer (HECO) preferably has/have (i) a heat resistance measured according to Vicat B of more than 78° C., more preferably in the range of 79 to 90° C., still more preferably in the range of 80 to 88° C., and/or (ii) hexane solubles measured according to FDA of below 3.6 wt.-%, more preferably of 1.5 to below 3.6 wt.-%, still more preferably in the range of 2.0 to 3.3 wt.-%.

The heterophasic propylene copolymer (HECO) according to this invention comprises a polypropylene (PP) as a matrix (M) and dispersed therein an elastomeric propylene copolymer (EC). Thus the polypropylene (PP) matrix contains (finely) dispersed inclusions being not part of the matrix (M) and said inclusions contain the elastomeric propylene copolymer (EC). The term inclusion indicates that the matrix (M) and the inclusion form different phases within the heterophasic propylene copolymer (HECO), said inclusions are for instance visible by high resolution microscopy, like electron microscopy or scanning force microscopy.

Preferably the heterophasic propylene copolymer (HECO) according to this invention comprises as polymer components only the polypropylene (PP) and the elastomeric propylene copolymer (EC). In other words the heterophasic propylene copolymer (HECO) may contain further additives but no other polymer in an amount exceeding 2.0 wt-%, more preferably exceeding 1.0 wt.-%, like exceeding 0.5 wt.-%, based on the total heterophasic propylene copolymer (HECO). One additional polymer which may be present in such low amounts is a polyethylene which is a by-reaction product obtained by the preparation of heterophasic propylene copolymer (HECO) (see in detail below). Accordingly it is in particular appreciated that the instant heterophasic propylene copolymer (HECO) contains only the polypropylene (PP) matrix, the elastomeric propylene copolymer (EC) and optionally polyethylene in amounts as mentioned in this paragraph.

Like the injection molded article, the heterophasic propylene copolymer (HECO) is featured by a rather high melt flow rate. Accordingly, it is preferred that the heterophasic propylene copolymer (HECO) has a melt flow rate MFR$_2$ (230° C.) of equal or more than 20 g/10 min, more preferably of equal or more than 25.0 g/10 min, still more preferably in the range of 25.0 to 200.0 g/10 min, yet more preferably in the range of 25.0 to 180 g/10 min, like in the range of 30.0 to 150 g/10 min.

Preferably the injection molded article is thermomechanically stable. The same holds true for its main component the heterophasic propylene copolymer (HECO). Accordingly it is appreciated that the heterophasic propylene copolymer (HECO) has a melting temperature of at least 160° C., more preferably of at least 162° C., still more preferably in the range of 163 to 170° C.

Additionally it is preferred that the crystallization temperature of the heterophasic propylene copolymer (HECO) is at least 120° C., more preferably at least 122° C., still more preferably in the range of 120 to 135° C.

The heterophasic propylene copolymer (HECO) comprises apart from propylene also comonomers. Preferably the heterophasic propylene copolymer (HECO) comprises apart from propylene ethylene and/or C$_4$ to C$_{12}$ α-olefins. Accordingly the term "propylene copolymer" according to this invention is understood as a polypropylene comprising, preferably consisting of, units derivable from
(a) propylene
and
(b) ethylene and/or C$_4$ to C$_{12}$ α-olefins.

Thus the propylene copolymers according to this invention, i.e. the heterophasic propylene copolymer (HECO), the random propylene copolymer fractions of the matrix, and the elastomeric propylene copolymer (EC), comprise monomers copolymerizable with propylene, for example comonomers such as ethylene and/or C$_4$ to C$_{12}$ α-olefins, in particular ethylene and/or C$_4$ to C$_8$ α-olefins, e.g. 1-butene and/or 1-hexene. Preferably the propylene copolymers according to this invention comprise, especially consist of, monomers copolymerizable with propylene from the group consisting of ethylene, 1-butene and 1-hexene. More specifically the propylene copolymers of this invention comprise—apart from propylene—units derivable from ethylene and/or 1-butene. In a preferred embodiment the propylene copolymers according to this invention comprise units derivable from ethylene and propylene only. Still more preferably the random propylene copolymer fractions of the matrix—if present—as well as the elastomeric propylene copolymer (EC) contain the same comonomers, like ethylene.

Accordingly, the elastomeric propylene copolymer (EC) is preferably an ethylene propylene rubber (EPR), whereas the polypropylene (PP) is either a random propylene copolymer (R-PP) or a propylene homopolymer (H-PP), the latter being preferred.

Additionally it is appreciated that the heterophasic propylene copolymer (HECO) preferably has a comonomer content equal or below 10 wt.-%, more preferably in the range of 2.0 to 10.0 wt.-%, more preferably in the range of 3.0 to 9.0 wt.-%, yet more preferably in the range of 3.5 to 7.0 wt.-%.

The statement of the previous paragraph is preferably also applicable for the injection molded article in which the heterophasic propylene copolymer (HECO) is the main component.

The xylene cold soluble (XCS) fraction measured according to ISO6427 (23° C.) of the heterophasic propylene copolymer (HECO) is preferably below 20.0 wt.-%, more preferably in the range of 5.0 to 20.0 wt.-%, like in the range of 9.0 to 18.0 wt.-%.

The heterophasic propylene copolymer (HECO) is in particular defined by the matrix (M) and the elastomeric propylene copolymer (EC) dispersed therein. Accordingly both components are now defined in more detail.

The matrix (M) is a polypropylene (PP), more preferably a random propylene copolymer (R-PP) or a propylene homopolymer (H-PP), the latter especially preferred.

Accordingly the comonomer content of the polypropylene (PP) is equal or below 1.0 wt.-%, yet more preferably not more than 0.8 wt.-%, still more preferably not more than 0.5 wt.-%, like not more than 0.1 wt.-%.

As mentioned above the polypropylene (PP) is preferably a propylene homopolymer (H-PP).

The expression propylene homopolymer as used throughout the instant invention relates to a polypropylene that consists substantially, i.e. of equal or below than 99.9 wt.-%, of propylene units. In a preferred embodiment only propylene units in the propylene homopolymer are detectable.

In case the polypropylene (PP) is a random propylene copolymer (R-PP) it is appreciated that the random propylene copolymer (R-PP) comprises monomers copolymerizable with propylene, for example comonomers such as ethylene and/or C$_4$ to C$_{12}$ α-olefins, in particular ethylene and/or C$_4$ to C$_8$ α-olefins, e.g. 1-butene and/or 1-hexene. Preferably the random propylene copolymer (R-PP) according to this invention comprises, especially consists of, monomers copolymerizable with propylene from the group consisting of ethylene, 1-butene and 1-hexene. More specifically the random propylene copolymer (R-PP) of this invention comprises—apart from propylene—units derivable from ethylene and/or 1-butene. In a preferred embodiment the random propylene copolymer (R-PP) comprises units derivable from ethylene and propylene only.

Additionally it is appreciated that the random propylene copolymer (R-PP) has preferably a comonomer content in the range of more than 0.1 to 2.0 wt.-%, more preferably in the range of more than 0.1 to 1.6 wt.-%, yet more preferably in the range of 0.1 to 1.0 wt.-%.

The term "random" indicates that the comonomers of the propylene copolymer (R-PP), as well as of the first random propylene copolymer (R-PP1), the second random propylene copolymer (R-PP2), and third random propylene copolymer (R-PP3), are randomly distributed within the propylene copolymers. The term random is understood according to IUPAC (Glossary of basic terms in polymer science; IUPAC recommendations 1996).

As stated above the heterophasic propylene copolymer (HECO) has a rather high melt flow rate. Accordingly, the same holds true for its matrix (M), i.e. the polypropylene (PP). Thus it is preferred that polypropylene (PP) has a melt flow rate MFR$_2$ (230° C.) measured according to ISO 1133 in the range of 30.0 to 500.0 g/10 min, more preferably of 40.0 to 400.0 g/10 min, still more preferably in the range of 50.0 to 300.0 g/10 min.

Further is appreciated that the matrix (M) of the heterophasic propylene copolymer (HECO) is featured by a moderately broad molecular weight distribution. Accordingly it is appreciated that the matrix of the heterophasic propylene copolymer (HECO), i.e. the polypropylene (PP), has a molecular weight distribution (MWD) of equal or less than 8.0, preferably of equal or less than 7.0, more preferably in the range of 3.0 to 7.0, still more preferably in the range of 3.5 to 6.5.

Additionally the polypropylene (PP) can be defined by its molecular weight. Thus it appreciated that the polypropylene (PP) has a weight average molecular weight (Mw) measured by gel permeation chromatography (GPC; ISO 16014-4:2003) of equal or less than 175 kg/mol, more preferably of equal or less than 165 kg/mol, yet more preferably in the range of 75 to 160 kg/mol, still more preferably in the range of 80 to 150 kg/mol.

The xylene cold soluble (XCS) content of the polypropylene (PP) is rather moderate. Accordingly xylene cold soluble (XCS) content measured according to ISO 6427 (23° C.) is preferably equal or below 3.5 wt.-%, more preferably equal or below 3.0 wt.-%, still more preferably in the range of 0.5 to 3.0 wt.-%, like in the range of 0.5 to 2.8 wt.-%.

As indicated above the polypropylene (PP) comprises at least three, more preferably comprises three, yet more preferably consists of three, polypropylene fractions (PP1), (PP2), and (PP3), the three polypropylene fractions (PP1), (PP2), and (PP3) differ from each other by the melt flow rate $MFR_2$ (230° C.) measured according to ISO 1133.

One of the three polypropylene fractions (PP1), (PP2), and (PP3), preferably the third polypropylene fraction (PP3), has a melt flow rate $MFR_2$ (230° C.) measured according to ISO 1133 in the range of 1.0 to equal or below 20.0 g/10 min, preferably in the range of 2.0 to equal or below 19.0 g/10 min, still more preferably in the range of 2.0 to equal or below 18.0 g/10 min. Still more preferably the polypropylene fraction with the melt flow rate $MFR_2$ (230° C.) measured according to ISO 1133 in the range of 1.0 to equal or below 20.0 g/10 min, i.e. in the range of 2.0 to equal or below 19.0 g/10 min, like in the range of 2.0 to 18.0 g/10 min, is the polypropylene fraction with the lowest melt flow rate $MFR_2$ (230° C.) of the three polypropylene fractions (PP1), (PP2) and (PP3), preferably of all polypropylene fractions present, of the polypropylene (PP). Accordingly in one preferred embodiment the third polypropylene fraction (PP3) has the lowest melt flow rate $MFR_2$ (230° C.) of the three polypropylene fractions (PP1), (PP2), and (PP3), wherein the melt flow rate $MFR_2$ (230° C.) measured according to ISO 1133 of the third polypropylene fraction (PP3) is in the range of 1.0 to equal or below 20.0 g/10 min, preferably in the range of 2.0 to equal or below 19.0 g/10 min, still more preferably in the range of 2.0 to equal or below 18.0 g/10 min. Alternatively or in addition to one preferred requirement that one of the three polypropylene fractions (PP1), (PP2) and (PP3) must have a melt flow rate $MFR_2$ (230° C.) measured according to ISO 1133 in the range of 1.0 to equal or below 20.0 g/10 min, it is preferred that a fraction (or another fraction) of the three polypropylene fractions (PP1), (PP2) and (PP3) has a melt flow rate $MFR_2$ (230° C.) measured according to ISO 1133 in the range of 80.0 to 500.0 g/10 min, preferably in the range of 150.0 to 450.0 g/10 min, more preferably in the range of 200.0 to 450.0 g/10 min. Particularly the first polypropylene fraction (PP1) has a melt flow rate $MFR_2$ (230° C.) measured according to ISO 1133 in the range of 80.0 to 500.0 g/10 min, preferably in the range of 150.0 to 450.0 g/10 min, more preferably in the range of 200.0 to 450.0 g/10 min.

In one preferred embodiment the remaining polypropylene fraction of the three polypropylene fractions (PP1), (PP2) and (PP3), preferably the second polypropylene fraction (PP2), has a melt flow rate $MFR_2$ (230° C.) measured according to ISO 1133 in the range of 20.0 to 300.0 g/10 min, preferably in the range of 30.0 to 250.0 g/10 min, more preferably in the range of 40.0 to 200.0 g/10 min.

Preferably the melt flow rate $MFR_2$ (230° C.) decreases from the first polypropylene fraction (PP1) to the third polypropylene fraction (PP3). Accordingly the ratio between the melt flow rate $MFR_2$ (230° C.) of the first polypropylene fraction (PP1) and the third polypropylene fraction (PP3) [MFR (PP1)/MFR (PP3)] is preferably at least 5, more preferably at least 10, yet more preferably at least 15 and/or the ratio between the melt flow rate $MFR_2$ (230° C.) of the second polypropylene fraction (PP2) and the third polypropylene fraction (PP3) [MFR (PP2)/MFR (PP3)] is preferably at least 1.3, more preferably at least 2.0, yet more preferably at least 3.0.

In another preferred embodiment the melt flow rate $MFR_2$ (230° C.) decreases from the first polypropylene fraction (PP1) to the second polypropylene fraction (PP2) and from the second polypropylene fraction (PP2) to the third polypropylene fraction (PP3). Accordingly the second polypropylene fraction (PP2) has a lower melt flow rate $MFR_2$ (230° C.) than the first polypropylene fraction (PP1) but a higher melt flow rate $MFR_2$ (230° C.) than the third polypropylene fraction (PP3).

Thus the third polypropylene fraction (PP3) has the lowest melt flow rate $MFR_2$ (230° C.) of the three polypropylenes fractions (PP1), (PP2), and (PP3), more preferably of all polymers present in the polypropylene (PP).

Preferably at least one of the polypropylene fractions (PP1), (PP2), and (PP3) is a propylene homopolymer, even more preferred all polypropylene fractions (PP1), (PP2), and (PP3) are propylene homopolymers.

Thus in a preferred embodiment the matrix (M), i.e. the polypropylene (PP), of the heterophasic propylene copolymer (HECO) comprises (a) a first polypropylene fraction (PP1) being a first propylene homopolymer (H-PP1) or a first random propylene copolymer (R-PP1), (b) a second polypropylene fraction (PP2) being a second propylene homopolymer (H-PP2) or a second random propylene copolymer (R-PP2), (c) a third polypropylene fraction (PP3) being a third propylene homopolymer (H-PP3) or a third random propylene copolymer (R-PP3), with the proviso that at least one of the three fractions PP1, PP2, and PP3 is a propylene homopolymer, preferably at least the first polypropylene fraction (PP1) is a propylene homopolymer, more preferably all three fractions (PP1), (PP2), and (PP3) are propylene homopolymers.

As mentioned above, it is in particular preferred that at least the first polypropylene fraction (PP1) is a propylene homopolymer, a so called first propylene homopolymer (H-PP1). Even more preferred this first polypropylene fraction (PP1) has the highest melt flow rate $MFR_2$ (230° C.) of the three polypropylenes (PP1), (PP2), and (PP3).

Still more preferred, in addition to the first polypropylene fraction (PP1) either the second polypropylene fraction (PP2) or the third polypropylene fraction (PP3) is a propylene homopolymer. In other words it is preferred that the polypropylene (PP) comprises, preferably consists of, only one polypropylene fraction being a random propylene copolymer. Accordingly either the second polypropylene fraction (PP2) is a propylene homopolymer, so called second propylene homopolymer (H-PP2), or the third polypropylene fraction (PP3) is a propylene homopolymer, so called third propylene homopolymer (H-PP3).

It is especially preferred that all three polypropylene fractions (PP1), (PP2), and (PP3) are propylene homopolymers.

In the following the three polypropylene fractions (PP1), (PP2), and (PP3) will be described in more detail.

As mentioned above the polypropylene fractions (PP1), (PP2), and (PP3) can be random propylene copolymers or propylene homopolymers. In any case the comonomer content shall be rather low for each of the polypropylene fractions (PP1), (PP2), and (PP3). Accordingly the comonomer content of each of the three polypropylene fractions (PP1), (PP2), and (PP3) is not more than 1.0 wt.-%, yet more preferably not more than 0.8 wt.-%, still more preferably not more than 0.5 wt.-%. In case of the random propylene copolymer fractions (R-PP1), (R-PP2), and (R-PP3) it is appreciated that the comonomer content for each of the random propylene copolymer fractions (R-PP1), (R-PP2), and (R-PP3) is in the range of more than 0.2 to 3.0 wt.-%, more preferably in the range of more than 0.2 to 2.5 wt.-%, yet more preferably in the range of 0.2 to 2.0 wt.-%.

Concerning the comonomers used in the first random propylene copolymer (R-PP1), the second random propylene copolymer (R-PP2), and the third random propylene copolymer (R-PP3) it is referred to the information provided for the heterophasic propylene copolymer (HECO). Accordingly the (R-PP1), (R-PP2), and (R-PP3) comprise independently from each other monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably (R-PP1), (R-PP2), and (R-PP3) comprise independently from each other, especially consists independently from each other of, monomers copolymerizable with propylene from the group consisting of ethylene, 1-butene and 1-hexene. More specifically the (R-PP1), (R-PP2), and (R-PP3) comprise independently from each other—apart from propylene—units derivable from ethylene and/or 1-butene. In a preferred embodiment the (R-PP1), (R-PP2), and (R-PP3) have apart from propylene the same comonomers. Thus in an especially preferred embodiment the (R-PP1), (R-PP2), and (R-PP3) comprise units derivable from ethylene and propylene only.

As stated above the first polypropylene fraction (PP1) is a random propylene copolymer fraction (R-PP1) or a propylene homopolymer fraction (H-PP1), the latter being preferred.

The xylene cold soluble (XCS) content measured according to ISO 6427 (23° C.) of the first polypropylene fraction (PP1) is preferably equal or below 4.0 wt.-%, more preferably equal or below 3.5 wt.-%, still more preferably in the range of 0.8 to 4.0 wt.-%, like in the range of 0.8 to 3.0 wt.-%.

As stated above the first polypropylene fraction (PP1) is featured by rather high melt flow rate $MFR_2$ (230° C.). Accordingly it is appreciated that the melt flow rate $MFR_2$ (230° C.) measured according to ISO 1133 is equal or more than 80.0 g/10 min, preferably of equal or more than 150.0 g/10 min more preferably in the range of 150.0 to 500.0 g/10 min, still more preferably in the range of 150.0 to 450.0 g/10 min, yet more preferably in the range of 200.0 to 450.0 g/10 min.

Alternatively or additionally the first polypropylene fraction (PP1) is defined by a low molecular weight. Thus it appreciated that the first polypropylene fraction (PP1) has a weight average molecular weight (Mw) measured by gel permeation chromatography (GPC; ISO 16014-4:2003) of equal or less than 130 kg/mol, more preferably of equal or less than 110 kg/mol, yet more preferably in the range of 72 to 110 kg/mol, still more preferably in the range of 75 to 100 kg/mol.

The second polypropylene fraction (PP2) can be either a random propylene copolymer fraction (second random propylene copolymer fraction (R-PP2)) or a propylene homopolymer fraction (a second propylene homopolymer fraction (H-PP2)), the latter being preferred.

The xylene cold soluble (XCS) content measured according to ISO 6427 (23° C.) of the second polypropylene fraction (PP2) is preferably equal or below 4.0 wt.-%, more preferably equal or below 3.5 wt.-%, still more preferably in the range of 0.8 to 4.0 wt.-%, like in the range of 0.8 to 3.0 wt.-%.

As stated above the second polypropylene fraction (PP2) has a melt flow rate $MFR_2$ (230° C.) being higher than the third polypropylene fraction (PP3). On the other hand the melt flow rate $MFR_2$ (230° C.) of the first polypropylene fraction (PP1) can be higher or equally the same, preferably higher, as the melt flow rate $MFR_2$ (230° C.) of the second polypropylene fraction (PP2). Accordingly it is appreciated that the second polypropylene fraction (PP2) has melt flow rate $MFR_2$ (230° C.) measured according to ISO 1133 in the range of equal or above 20.0 to 300.0 g/10 min, preferably in the range of 30.0 to 250.0 g/10 min, more preferably in the range of 40.0 to 200.0 g/10 min.

The third polypropylene fraction (PP3) can be either a random propylene copolymer fraction (third random propylene copolymer fraction (R-PP3)) or a propylene homopolymer fraction (a third propylene homopolymer fraction (H-PP3)), the latter being preferred.

The xylene cold soluble (XCS) content measured according to ISO 6427 (23° C.) of the third polypropylene fraction (PP3) is preferably equal or below 4.0 wt.-%, more preferably equal or below 3.5 wt.-%, still more preferably in the range of 0.8 to 4.0 wt.-%, like in the range of 0.8 to 3.0 wt.-%.

As stated above the third polypropylene (PP3) has preferably the lowest melt flow rate $MFR_2$ (230° C.) of the three polypropylene fractions (PP1), (PP2), and (PP3), more preferably the lowest melt flow rate $MFR_2$ (230° C.) of the polymer fractions present in the polypropylene (PP). Accordingly it is appreciated that the third polypropylene (PP3) has melt flow rate $MFR_2$ (230° C.) measured according to ISO 1133 in the range of 1.0 to equal or below 20.0 g/10 min, preferably in the range of 2.0 to equal or below 19.0 g/10 min, still more preferably in the range of 2.0 to equal or below 18.0 g/10 min.

Especially good results are obtainable in case the individual fractions are present in specific amounts. Accordingly it is preferred that the amount of the polypropylene fraction having a melt flow rate $MFR_2$ (230° C.) measured according to ISO 1133 in the range of 1.0 to equal or below 20.0 g/10 min (preferably in the range of 2.0 to equal or below 19.0 g/10 min, still more preferably in the range of 2.0 to equal or below 18.0 g/10 min), preferably the amount of the third polypropylene fraction (PP3), is in the range of 15.0 to 60.0 wt.-% based, more preferably in the range of 20.0 to 40.0 wt.-%, on the total amount of the polypropylene (PP), preferably based on the amount of the polypropylene fractions (PP1), (PP2), and (PP3) together.

Further it is appreciated that the amount of the polypropylene fraction having a melt flow rate $MFR_2$ (230° C.) measured according to ISO 1133 in the range of 150.0 to 500.0 g/10 min, preferably in the range of 150.0 to 450.0 g/10 min, more preferably in the range of 200.0 to 450.0 g/10 min, preferably of the first polypropylene fraction (PP1), is in the range of 20.0 to 65.0 wt.-%, preferably in the range of 35.0 to 55.0 wt.-%, based on the total amount of the polypropylene (PP), preferably based on the amount of the polypropylene fractions (PP1), (PP2), and (PP3) together.

Finally the remaining fraction of the three polypropylene fractions (PP1), (PP2), and (PP3), preferably the second polypropylene fraction (PP2) is present in the range of 20.0 to 50.0 wt.-%, preferably in the range of 25.0 to 45.0 wt.-%, based on the total amount of the polypropylene (PP), preferably based on the amount of the polypropylene fractions (PP1), (PP2), and (PP3) together.

Accordingly in a preferred embodiment is the weight ratio [PP3/PP1] of the polypropylene fraction having a melt flow rate $MFR_2$ (230° C.) measured according to ISO 1133 in the range of 1.0 to equal or below 20.0 g/10 min, preferably of the third polypropylene fraction (PP3), and the polypropylene fraction having a melt flow rate $MFR_2$ (230° C.) measured according to ISO 1133 in the range of 150.0 to 500.0 g/10 min, preferably of the first polypropylene fraction (PP1), is in the range of 15/85 to 75/25, more preferably in the range of 25/75 to 55/45.

Very good results are achievable in case the polypropylene (PP) comprises
(a) 20.0 to 65.0 wt.-%, preferably 35.0 to 55.0 wt.-%, of the first polypropylene (PP1),
(b) 20.0 to 50.0 wt.-%, preferably 25.0 to 45.0 wt.-%, of the second polypropylene (PP2), and
(c) 15.0 to 60.0 wt.-%, preferably 20.0 to 40.0 wt.-%, of the third polypropylene (PP3), based on the total amount of the first polypropylene fraction (PP1), the second polypropylene fraction (PP2), and the third polypropylene fraction (PP3).

Preferably the polypropylene (PP) is produced in a sequential polymerization process, preferably as described in detail below. Accordingly the three polypropylene fractions (PP1), (PP2), and (PP3) are an intimate mixture, which is not obtainable by mechanical blending.

A further essential component of the heterophasic propylene copolymer (HECO) is the elastomeric propylene copolymer (EC) dispersed in the matrix, i.e. in the polypropylene (PP). Concerning the comonomers used in the elastomeric propylene copolymer (EC) it is referred to the information provided for the heterophasic propylene copolymer (HECO). Accordingly the elastomeric propylene copolymer (EC) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the elastomeric propylene copolymer (EC) comprises, especially consists of, monomers copolymerizable with propylene from the group consisting of ethylene, 1-butene and 1-hexene. More specifically the elastomeric propylene copolymer (EC) comprises—apart from propylene—units derivable from ethylene and/or 1-butene. Thus in an especially preferred embodiment the elastomeric propylene copolymer (EC) comprises units derivable from ethylene and propylene only.

The properties of the elastomeric propylene copolymer (EC) mainly influences the xylene cold soluble (XCS) content as well as the amorphous phase (AM) of the final heterophasic propylene copolymer (HECO). Thus according to the present invention the amorphous phase (AM) of the xylene cold soluble (XCS) of the heterophasic propylene copolymer (HECO) is regarded as the elastomeric propylene copolymer (EC) of the heterophasic propylene copolymer (HECO). As mentioned above the heterophasic propylene copolymer (HECO) constitutes the main component of the injection molded article. Accordingly it is especially preferred that the amorphous phase (AM) of the xylene cold soluble (XCS) of the injection molded article is the elastomeric propylene copolymer (EC) of the heterophasic propylene copolymer (HECO).

Accordingly one important requirement of the present invention is that the elastomeric propylene copolymer (EC) has a rather high weight average molecular weight. High intrinsic viscosity (IV) values reflect a high weight average molecular weight. Thus it is appreciated that the amorphous phase (AM) of the xylene cold soluble fraction (XCS) of the heterophasic propylene copolymer (HECO) and/or of the injection molded article has an intrinsic viscosity (IV) measured according to ISO 1628-1 (at 135° C. in decalin) of equal or higher than 2.0 dl/g, more preferably of equal or higher than 2.4 dl/g, i.e. 2.5 dl/g, still more preferably in the range of 2.4 to 5.0 dl/g, i.e. 2.5 to 5.0 dl/g, like in the range of 2.4 to 4.0, i.e. 2.5 to 4.0 dl/g.

The comonomer content, preferably the ethylene content, within the elastomeric propylene copolymer (EC) is comparatively low. Accordingly in a preferred embodiment the comonomer content, more preferably ethylene content, of the amorphous phase (AM) of the xylene cold soluble fraction (XCS) of the heterophasic propylene copolymer (HECO) and/or of the injection molded article is below 45.0 wt.-%, more preferably below 42.0 wt.-%, yet more preferably in the range of 25.0 to 45.0 wt.-%, like 30.0 to 42.0 wt.-%.

The heterophasic propylene copolymer (HECO) according to this invention preferably comprises
(a) 80.0 to 94.0 wt.-%, more preferably 83.0 to 94.0 wt.-%, of the polypropylene (PP), and
(b) 6.0 to 20.0 wt.-%, more preferably 6.0 to 17.0 wt.-%, of the elastomeric copolymer (EC),
based on the total amount of the polypropylene (PP) and the elastomeric copolymer (EC), wherein the amount of the elastomeric copolymer (EC) corresponds to the amount of the amorphous fraction (AM) of the xylene cold soluble (XCS) fraction.

The heterophasic propylene copolymer (HECO) as defined in the instant invention may contain up to 2.0 wt.-% additives, like nucleating agents and antioxidants, as well as slip agents, antistatic agents and talc. Especially good results are achievable in case the heterophasic propylene copolymer (HECO) comprises nucleating agents.

Concerning the nucleating agents present in the heterophasic propylene copolymer (HECO) it is preferred that the nucleating agent is a α-nucleating agent, more preferably a α-nucleating agent selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis(4,6,-di-tert-butylphenyl) phosphate or aluminium-hydroxy-bis[2,2'-methylene-bis(4,6-di-t-butylphenyl)phosphate], and
(iv) vinylcycloalkane polymer and vinylalkane polymer, and
(v) mixtures thereof.

Preferably the α-nucleating agent is selected from group (i), like sodium benzoate, (ii) or (iv).

Typically the amount of α-nucleating agent in the heterophasic propylene copolymer (HECO) is 0.001 to 1.0 wt.-%, more preferably 0.01 to 0.5 wt.-%, yet more preferably 0.01 to 0.3 wt.-%, based on the total amount of the heterophasic propylene copolymer (HECO).

The instant invention is also directed to the use of the heterophasic propylene copolymer (HECO) as defined above to improve the scratch visibility of injection molded articles. Accordingly the present invention is in particular directed to the use of a heterophasic propylene copolymer (HECO) to improve the scratch visibility of injection molded articles, said heterophasic propylene copolymer (HECO) comprises (a) a matrix (M) being a polypropylene (PP), said polypropylene (PP) comprises at least three polypropylene fractions (PP1), (PP2) and (PP3), the three polypropylene fractions (PP1), (PP2) and (PP3) differ from each other by the melt flow rate $MFR_2$ (230° C.) measured according to ISO 1133 and at least one of the three polypropylene fractions (PP1), (PP2) and (PP3) has a melt flow rate $MFR_2$ (230° C.) measured according to ISO 1133 in the range of 1.0 to 15.0 g/10 min, and (b) an elastomeric propylene copolymer (EC) dispersed in said matrix (M), wherein (i) said heterophasic propylene copolymer (HECO) has a melt flow rate $MFR_2$ (230° C.) measured according to ISO 1133 of equal or more than 20.0 g/10 min, and (ii) the amorphous phase (AM) of the xylene cold soluble fraction (XCS) of the heterophasic propylene copolymer (HECO) has an intrinsic viscosity (IV) measured according to ISO 1628-1 (at 135° C. in decaline) of equal or higher than 2.0 dl/g, wherein
the improvement of the scratch visibility is measured on moulded plaques of 150×80×2 $mm^3$ size having a high gloss surface on which scratches were applied at a force of 10 N, the scratch visibility is reported as the difference of the luminance ΔL of the unscratched from the scratched areas.

Preferably the heterophasic propylene copolymer (HECO) is the same as discussed for the injection molded articles. Accordingly preferred embodiments discussed for the injection molded articles are equally applicable for the use of the heterophasic propylene copolymer (HECO). The used amount of the heterophasic propylene copolymer (HECO) in the injection molded article to achieve the desired scratch resistance is preferably at least 60 wt.-%, more preferably at least 70 wt.-%, still more preferably at least 90 wt.-%, yet more preferably at least 95 wt.-%, like 95 to 100 wt.-%. It is especially preferred that the heterophasic propylene copolymer (HECO) is used as the only polymer in the injection molded article. Accordingly, in one specific embodiment only the heterophasic propylene copolymer (HECO) is used for the injection molded article.

Preferably the improvement of the scratch visibility is given in case the scratch visibility of
(a) the composition used for the manufacture of injection molded articles and comprising the heterophasic propylene copolymer (HECO)
and/or
(b) the heterophasic propylene copolymer (HECO) itself measured under the conditions defined in the instant invention is not more than 0.6, more preferably of not more than 0.5, still more preferably of 0.1 to 0.6, yet more preferably of 0.2 to 0.5, like 0.3 to 0.5, the values are absolute values.

More preferably the heterophasic propylene copolymer (HECO) according to this invention is not only used to reduce the scratch resistance as defined above but is also used to enhance the stiffness and/or the impact resistance. The improvement is preferably achieved in case the injection molded article and/or the heterophasic propylene copolymer (HECO) has
(a) a tensile modulus measured according to ISO 527-2 of at least 1500 MPa, more preferably of at least 1600 MPa, like of at least 1680 MPa, still more preferably in the range of 1500 to 3000 MPa, yet more preferably 1600 to 2500 MPa, like in the range of 1680 to 2500 MPa,
and/or
(b) an impact strength determined according to ISO 179/1 eA at 23° C. of at least 3.0 $kJ/m^2$, more preferably of at least 4.0 $kJ/m^2$, still more preferably in the range of 3.0 to 50.0 $kJ/m^2$, yet more preferably in the range of 4.0 to 15.0 $kJ/m^2$,
and/or
(c) an impact strength determined according to ISO 179/1 eA at −20° C. of at least 2.0 $kJ/m^2$, more preferably of at least 2.5 $kJ/m^2$, still more preferably in the range of 2.0 to 15.0 $kJ/m^2$, yet more preferably in the range of 2.5 to 10.0 $kJ/m^2$.

The heterophasic propylene copolymer (HECO) as defined above is preferably produced by a sequential polymerization process as defined below.

Accordingly the heterophasic propylene copolymer (HECO) comprising a first polypropylene fraction (PP1), a second polypropylene fraction (PP2) and a third polypropylene fraction (PP3), is preferably obtained by a process comprising the steps of (a1) polymerizing propylene and optionally at least one ethylene and/or $C_4$ to $C_{12}$ α-olefin in a first reactor (R1) obtaining the first polypropylene fraction (PP1), preferably said first polypropylene fraction (PP1) is a first propylene homopolymer fraction (H-PP1), (b1) transferring the first polypropylene fraction (PP1) into a second reactor (R2), (c1) polymerizing in the second reactor (R2) and in the presence of said first polypropylene fraction (PP1) propylene and optionally at least one ethylene and/or $C_4$ to $C_{12}$ α-olefin obtaining thereby the second polypropylene fraction (PP2), preferably said second polypropylene fraction (PP2) is a second propylene homopolymer fraction (H-PP2), the first polypropylene fraction (PP1) being mixed with the second polypropylene fraction (PP2), (d1) transferring the mixture of step (c1) into a third reactor (R3), (e1) polymerizing in the third reactor (R3) and in the presence of the mixture obtained in step (c1) propylene and optionally at least one ethylene and/or $C_4$ to $C_{12}$ α-olefin obtaining thereby a third polypropylene fraction (PP3), preferably said third polypropylene fraction (PP3) is a third propylene homopolymer fraction (H-PP3), the first polypropylene fraction (PP1), the second polypropylene fraction (PP2) and the third polypropylene fraction (PP3) form the polypropylene (PP), (f1) transferring the polypropylene (PP) in a fourth reactor (R4), and (g1) polymerizing in the fourth reactor (R4) and in the presence of the polypropylene (PP) propylene and at least one ethylene and/or $C_4$ to $C_{12}$ α-olefin obtaining thereby an elastomeric propylene copolymer (EC), the polypropylene (PP) and the elastomeric propylene copolymer (EC) form the heterophasic propylene copolymer (HECO), or (a2) polymerizing propylene and optionally at least one ethylene and/or $C_4$ to $C_{12}$ α-olefin in a first reactor (R1) obtaining the first polypropylene fraction (PP1), (b2) transferring the first polypropylene fraction (PP1) into a second reactor (R2), (c2) polymerizing in the second reactor (R2) and in the presence of said first polypropylene fraction (PP1) propylene and optionally at least one ethylene and/or $C_4$ to $C_{12}$ α-olefin obtaining thereby the third polypropylene fraction (PP3), the first polypropylene fraction (PP1) being mixed with the third polypropylene fraction (PP3), (d2) transferring the mixture of step (c2) into a third reactor (R3), (e2) polymerizing in the third reactor (R3) and in the presence of the mixture obtained in step (c2) propylene and optionally at least one ethylene and/or $C_4$ to $C_{12}$ α-olefin obtaining thereby a second polypropylene fraction (PP2), the first polypropylene fraction (PP1), the second polypropylene fraction (PP2) and the third polypropylene fraction (PP3) form the polypropylene (PP), (f2) transferring the polypropylene (PP) into a fourth reactor (R4), and (g2) polymerizing in the fourth reactor (R4) and in the presence of the polypropylene (PP) propylene and at least one ethylene and/or $C_4$ to $C_{12}$ α-olefin obtaining thereby an elastomeric propylene copolymer (EC), the polypropylene (PP) and the elastomeric propylene copolymer (EC) form the heterophasic propylene copolymer (HECO).

Preferably between the second reactor (R2) and the third reactor (R3) and optionally between the third reactor (R3) and fourth reactor (R4) the monomers are flashed out.

For preferred embodiments of the heterophasic propylene copolymer (HECO), the polypropylene (PP), the first polypropylene fraction (PP1), the second polypropylene fraction (PP2), and the third polypropylene fraction (PP3), as well as for the elastomeric copolymer (EC) reference is made to the definitions given above.

The term "sequential polymerization process" indicates that the polypropylene is produced in at least four reactors connected in series. Accordingly the present process comprises at least a first reactor (R1), a second reactor (R2), a third reactor (R3) and a fourth reactor (R4). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2), the third reactor (R3) and the fourth reactor (R4) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 msec. Thus it is appreciated that the gas phase reactor is a fluidized bed type reactor preferably with a mechanical stirrer.

Thus in a preferred embodiment the first reactor (R1) is a slurry reactor (SR), like loop reactor (LR), whereas the second reactor (R2), the third reactor (R3) and the fourth reactor (R4) are gas phase reactors (GPR). Accordingly for the instant process at least four, preferably four polymerization reactors, namely a slurry reactor (SR), like loop reactor (LR), a first gas phase reactor (GPR-1), a second gas phase reactor (GPR-2) and a third gas phase reactor (GPR-3) connected in series are used. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (HECO) as defined above the conditions for the first reactor (R1), i.e. the slurry reactor (SR), like a loop reactor (LR), of step (a) may be as follows:

the temperature is within the range of 50° C. to 110° C., preferably between 60° C. and 100° C., more preferably between 68 and 95° C., the pressure is within the range of 20 bar to 80 bar, preferably between 40 bar to 70 bar, hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third reactor (R3) and the fourth reactor (R4), preferably in the second gas phase reactor (GPR-2) and third gas phase reactor (GPR-4), is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (HECO) is obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention is prepared by a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

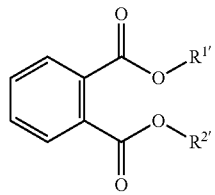

(I)

wherein $R^{1'}$ and $R^{2'}$ are independently at least a $C_5$ alkyl
under conditions where a transesterification between said $C_1$ to $C_2$ alcohol and said dialkylphthalate of formula (I) takes place to form the internal donor
c) washing the product of stage b) or
d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2$*nROH, wherein R is methyl or ethyl, preferably ethyl and n is 1 to 6, is contacting with $TiCl_4$ to form a titanized carrier, followed by the steps of adding to said titanised carrier
(i) a dialkylphthalate of formula (I) with $R^{1'}$ and $R^{2'}$ being independently at least a $C_5$-alkyl, like at least a $C_8$-alkyl,
or preferably
(ii) a dialkylphthalate of formula (I) with $R^{1'}$ and $R^{2'}$ being the same and being at least a $C_5$-alkyl, like at least a $C_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate, to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

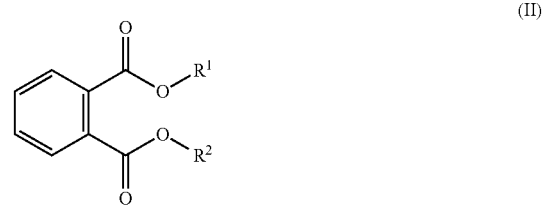

(II)

with $R^1$ and $R^2$ being methyl or ethyl, preferably ethyl, the dialkylphthalat of formula (II) being the internal donor
and
recovering said transesterification product as the procatalyst composition (component (i)).

The adduct of the formula $MgCl_2$*nROH, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the example section; especially with the use of dioctylphthalate as dialkylphthalate of formula (I).

For the production of the heterophasic propylene copolymer (HECO) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (III)

$$Si(OCH_3)_2R_2^5 \qquad (III)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

More preferably the external donor is selected from the group consisting of diethylaminotriethoxysilane [Si(OCH$_2$CH$_3$)$_3$(N(CH$_2$CH$_3$)$_2$)], dicyclopentyl dimethoxy silane [Si(OCH$_3$)$_2$(cyclo-pentyl)$_2$], diisopropyl dimethoxy silane [Si(OCH$_3$)$_2$(CH(CH$_3$)$_2$)$_2$] and mixtures thereof.

In a further embodiment, the Ziegler-Natta procatalyst can be modified by polymerizing a vinyl compound in the presence of the catalyst system, comprising the special Ziegler-Natta procatalyst (component (i)), an external donor (component (iii) and optionally a cocatalyst (component (iii)), which vinyl compound has the formula (IV):

$$CH_2\!=\!CH\!-\!CHR^3R^4 \qquad (IV)$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic propylene copolymer according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

The additives as stated above are added afterwards to the heterophasic propylene copolymer (HECO), which is collected from the final reactor of the series of reactors. Preferably, these additives are mixed into the composition prior to or during the extrusion process in a one-step compounding process. Alternatively, a master batch may be formulated, wherein the heterophasic propylene copolymer (HECO) is first mixed with only some of the additives.

For mixing, a conventional compounding or blending apparatus, e.g. a Banbury mixer, a t-roll rubber mill, Buss-co-kneader or a twin screw extruder may be used. The polymer materials recovered from the extruder are usually in the form of pellets. These pellets are then preferably further processed, e.g. by injection molding to generate the injection molded articles according to the present invention.

For producing the injection molded articles reference is made for instance to the "Polypropylene Handbook" of Nello Pasquini, 2$^{nd}$ Edition, Hanser.

In the following the present invention is further illustrated by means of examples.

EXAMPLES

A. Measuring Methods

The following definitions of terms and determination methods apply for the above general description of the invention as well as to the below examples unless otherwise defined. Calculation of comonomer content of the second polypropylene fraction (PP2):

$$\frac{C(R2) - w(PP1) \times C(PP1)}{w(PP2)} = C(PP2)$$

wherein
w(PP1) is the weight fraction of the first polypropylene fraction (PP1), i.e. the product of the first reactor (R1),
w(PP2) is the weight fraction of the second polypropylene fraction (PP2), i.e. of the polymer produced in the second reactor (R2),
C(PP1) is the comonomer content [in wt.-%] of the first polypropylene fraction (PP1), i.e. of the product of the first reactor (R1),
C(R2) is the comonomer content [in wt.-%] of the product obtained in the second reactor (R2), i.e. the mixture of the first polypropylene fraction (PP1) and the second polypropylene fraction (PP2),
C(PP2) is the calculated comonomer content [in wt.-%] of the second polypropylene (PP2).

Calculation of the xylene cold soluble (XCS) content of the second polypropylene fraction (PP2):

$$\frac{XS(R2) - w(PP1) \times XS(PP1)}{w(PP2)} = XS(PP2)$$

wherein
w(PP1) is the weight fraction of the first polypropylene fraction (PP1), i.e. the product of the first reactor (R1),
w(PP2) is the weight fraction of the second polypropylene fraction (PP2), i.e. of the polymer produced in the second reactor (R2),
XS (PP1) is the xylene cold soluble (XCS) content [in wt.-%] of the first polypropylene fraction (PP1), i.e. of the product of the first reactor (R1),
XS(R2) is the xylene cold soluble (XCS) content [in wt.-%] of the product obtained in the second reactor (R2), i.e. the mixture of the first polypropylene fraction (PP1) and the second polypropylene fraction (PP2),
XS(PP2) is the calculated xylene cold soluble (XCS) content [in wt.-%] of the second polypropylene fraction (PP2).

Calculation of melt flow rate MFR$_2$ (230° C.) of the second polypropylene fraction (PP2):

$$MFR(PP2) = 10^{\left[\frac{\log(MFR(R2)) - w(PP1) \times \log(MFR(PP1))}{w(PP2)}\right]}$$

wherein
w(PP1) is the weight fraction of the first polypropylene fraction (PP1), i.e. the product of the first reactor (R1),
w(PP2) is the weight fraction of the second polypropylene fraction (PP2), i.e. of the polymer produced in the second reactor (R2),
MFR(PP1) is the melt flow rate MFR$_2$ (230° C.) [in g/10 min] of the first polypropylene fraction (PP 1), i.e. of the product of the first reactor (R1),
MFR(R2) is the melt flow rate MFR$_2$ (230° C.) [in g/10 min] of the product obtained in the second reactor (R2), i.e. the mixture of the first polypropylene fraction (PP1) and the second polypropylene fraction (PP2), MFR(PP2) is the calculated melt flow rate MFR$_2$ (230° C.) [in g/10 min] of the second polypropylene fraction (PP2).

Calculation of comonomer content of the third polypropylene fraction (PP3):

$$\frac{C(R3) - w(R2) \times C(R2)}{w(PP3)} = C(PP3)$$

wherein w(R2) is the weight fraction of the second reactor (R2), i.e. the mixture of the first polypropylene fraction (PP1) and the second polypropylene fraction (PP2), w(PP3) is the weight fraction of the third polypropylene fraction (PP3), i.e. of the polymer produced in the third reactor (R3), C(R2) is the comonomer content [in wt.-%] of the product of the second reactor (R2), i.e. of the mixture of the first polypropylene fraction (PP1) and second polypropylene fraction (PP2), C(R3) is the comonomer content [in wt.-%] of the product obtained in the third reactor (R3), i.e. the mixture of the first polypropylene fraction (PP1), the second polypropylene fraction (PP2), and the third polypropylene fraction (PP3), C(PP3) is the calculated comonomer content [in wt.-%] of the third polypropylene fraction (PP3).

Calculation of xylene cold soluble (XCS) content of the third polypropylene fraction (PP3):

$$\frac{XS(R3) - w(R2) \times XS(R2)}{w(PP3)} = XS(PP3)$$

wherein w(R2) is the weight fraction of the second reactor (R2), i.e. the mixture of the first polypropylene fraction (PP1) and the second polypropylene fraction (PP2), w(PP3) is the weight fraction of the third polypropylene fraction (PP3), i.e. of the polymer produced in the third reactor (R3), XS(R2) is the xylene cold soluble (XCS) content [in wt.-%] of the product of the second reactor (R2), i.e. of the mixture of the first polypropylene fraction (PP1) and second polypropylene fraction (PP2), XS(R3) is the xylene cold soluble (XCS) content [in wt.-%] of the product obtained in the third reactor (R3), i.e. the mixture of the first polypropylene fraction (PP1), the second polypropylene fraction (PP2), and the third polypropylene fraction (PP3), XS(PP3) is the calculated xylene cold soluble (XCS) content [in wt.-%] of the third polypropylene fraction (PP3).

Calculation of melt flow rate MFR$_2$ (230° C.) of the third polypropylene fraction (PP3):

$$MFR(PP3) = 10^{\left[\frac{\log(MFR(R3)) - w(R2) \times \log(MFR(R2))}{w(PP3)}\right]}$$

wherein w(R2) is the weight fraction of the second reactor (R2), i.e. the mixture of the first polypropylene fraction (PP1) and the second polypropylene fraction (PP2), w(PP3) is the weight fraction of the third polypropylene fraction (PP3), i.e. of the polymer produced in the third reactor (R3), MFR(R2) is the melt flow rate MFR$_2$ (230° C.) [in g/10 min] of the product of the second reactor (R2), i.e. of the mixture of the first polypropylene fraction (PP1) and second polypropylene fraction (PP2), MFR(R3) is the melt flow rate MFR$_2$ (230° C.) [in g/10 min] of the product obtained in the third reactor (R3), i.e. the mixture of the first polypropylene fraction (PP1), the second polypropylene fraction (PP2), and the third polypropylene fraction (PP3), MFR(PP3) is the calculated melt flow rate MFR$_2$ (230° C.) [in g/10 min] of the third polypropylene fraction (PP3).

NMR-Spectroscopy Measurements:

The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the pentad analysis the assignment is done according to the methods described in literature: (T. Hayashi, Y. Inoue, R. Chüjö, and T. Asakura, Polymer 29 138-43 (1988). and Chujo R, et al, Polymer 35 339 (1994).

The NMR-measurement was used for determining the mmmm pentad concentration in a manner well known in the art.

Number average molecular weight ($M_n$), weight average molecular weight ($M_w$) and molecular weight distribution (MWD) are determined by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min 216.5 µL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Melt Flow Rate (MFR$_2$)

The melt flow rates were measured with a load of 2.16 kg (MFR$_2$) at 230° C. The melt flow rate is that quantity of polymer in grams which the test apparatus standardized to ISO 1133 extrudes within 10 minutes at a temperature of 230° C. under a load of 2.16 kg.

Comonomer content in polyethylene was measured in a known manner based on Fourier transform infrared spectroscopy (FTIR) calibrated with $^{13}$C-NMR, using Nicolet Magna 550 IR spectrometer together with Nicolet Omnic FTIR software.

Films having a thickness of about 250 µm were compression molded from the samples. Similar films were made from calibration samples having a known content of the comonomer. The comonomer content was determined from the spectrum from the wave number range of from 1430 to 1100 cm$^{-1}$. The absorbance is measured as the height of the peak by selecting the so-called short or long base line or both. The short base line is drawn in about 1410-1320 cm$^1$ through the minimum points and the long base line about between 1410 and 1220 cm$^1$. Calibrations need to be done specifically for each base line type. Also, the comonomer content of the unknown sample needs to be within the range of the comonomer contents of the calibration samples.

The xylene solubles (XCS, wt.-%): Content of xylene cold solubles (XCS) is determined at 25° C. according ISO 16152; first edition; 2005 Jul. 1.

The amorphous content (AM) is measured by separating the above xylene cold soluble fraction (XCS) and precipitating the amorphous part with acetone. The precipitate was filtered and dried in a vacuum oven at 90° C.

$$AM\ \% = \frac{100 \times m1 \times v0}{m0 \times v1}$$

wherein
"AM %" is the amorphous fraction,
"m0" is initial polymer amount (g)
"m1" is weight of precipitate (g)
"v0" is initial volume (ml)
"v1" is volume of analyzed sample (ml)

Intrinsic viscosity is measured according to DIN ISO 1628/1, October 1999 (in Decalin at 135° C.).

Melting temperature $T_m$, crystallization temperature T, is measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3.

Vicat B: Vicat B is measured according to ISO 306 (50 N) using injection moulded test specimens as described in EN ISO 1873-2 (80×10×4 mm) Viact B is the temperature at which the specimen is penetrated to a depth of 1 mm by a flat-ended needle with a 1 sq. mm circular or square cross-section, under a 1000 gm load.

Tensile Modulus is measured according to ISO 527-2 (cross head speed=50 mm/min; 23° C.) using injection molded specimens as described in EN ISO 1873-2 (dog bone shape, 4 mm thickness).

Flexural Modulus: The flexural modulus was determined in 3-point-bending at 23° C. according to ISO 178 on 80×10×4 mm³ test bars injection moulded in line with EN ISO 1873-2.

Charpy notched impact strength is determined according to ISO 179/1 eA at 23° C. and at −20° C. by using injection moulded test specimens as described in EN ISO 1873-2 (80×10×4 mm)

The hexane extractable fraction was determined according to FDA method (federal registration, title 21, Chapter 1, part 177, section 1520, s. Annex B). 1 g sample of cast film of 100 μm thickness (produced on a monolayer cast film line with a melt temperature of 220° C. and a chill roll temperature of 40° C.) was extracted at 50° C. in 400 ml n-hexane for 2 hours and then filtered on a filter paper No 41. The filtrate was then evaporated and the total residue weighed as a measure of the n-hexane extractable fraction.

Scratch Visibility

To determine the scratch visibility a Cross Hatch Cutter Model 420P, manufactured by Erichsen, was used. For the tests, plaques of 150*80*2 mm³, having a high-gloss surface and moulded acc ISO 1873-2 were used.

The minimum period between injection moulding of specimens and scratch-testing was 7 days.

For testing the specimens must be clamped in a suitable apparatus as described above. Scratches were applied at a force of 5 and 10 N respectively using a cylindrical metal pen with a ball shaped end (radius=0.5 mm±0.01). A cutting speed of 1000 mm/min was used. A minimum of 20 scratches parallel to each other were brought up at a load of 5 N and 10 N, respectively, with a distance of 2 mm. The application of the scratches was repeated perpendicular to each other, so that the result was a scratching screen. The scratching direction should be unidirectional.

The scratch visibility is reported as the absolute value of the difference of the luminance ΔL between the unscratched and the scratched areas. ΔL values were measured using a spectrophotometer that fulfils the requirements to DIN 5033. Light source for quantification of ΔL D65/10°, measuring opening diameter: 30 mm. Measured ΔL values must be below a maximum of 1.5.

A detailed test description of the test method (Erichsen cross hatch cutter method) can be found in the article "Evaluation of scratch resistance in multiphase PP blends" by Thomas Koch and Doris Machl, published in POLYMER TESTING 26 (2007), p. 927-936.

B. Examples

The catalyst used in the polymerization process for example E1 has been produced as follows: First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390. As co-catalyst triethyl-aluminium (TEAL) and as donor diethylaminotri-ethoxysilane [$Si(OCH_2CH_3)_3(N(CH_2CH_3)_2)$] was used. The aluminium to donor ratio is indicated in table 1. Before the polymerization, the catalyst was prepolymerized with vinyl cyclohexane in an amount to achieve a concentration of 200 ppm poly(vinyl cyclohexane) (PVCH) in the final polymer. The respective process is described in EP 1 028 984 and EP 1 183 307.

The polymer was produced in a Borstar pilot plant with a prepolymerization reactor, one slurry loop reactor and three gas phase reactors.

TABLE 1

Preparation of the heterophasic propylene copolymer (HECO)/IE

| Parameter | unit | IE |
|---|---|---|
| Prepolymerization | | |
| temperature | [° C.] | 30 |
| pressure | [kPa] | 5300 |
| Al/donor ratio | [mol/mol] | 15 |
| residence time | [h] | 0.5 |

TABLE 1-continued

Preparation of the heterophasic propylene copolymer (HECO)/IE

| Parameter | unit | IE |
|---|---|---|
| Loop | | |
| temperature | [° C.] | 70 |
| pressure | [kPa] | 5500 |
| residence time | [h] | 0.5 |
| H2/C3 ratio | [mol/kmol] | 28 |
| GPR 1 | | |
| temperature | [° C.] | 80 |
| pressure | [kPa] | 2000 |
| residence time | [h] | 1.5 |
| H2/C3 ratio | [mol/kmol] | 194 |
| GPR 2 | | |
| temperature | [° C.] | 90 |
| pressure | [kPa] | 2200 |
| residence time | [h] | 1.7 |
| C2/C3 ratio | [mol/kmol] | 5.5 |
| H2/C3 ratio | [mol/kmol] | 25 |
| GPR 3 | | |
| temperature | [° C.] | 75 |
| pressure | [kPa] | 2000 |
| residence time | [h] | 1.0 |
| H2/C2 ratio | [mol/kmol] | 90 |
| C2/C3 ratio | [mol/kmol] | 450 |

TABLE 2

Properties of the heterophasic propylene copolymer (HECO)/IE Loop, GPR1, GPR2, GPR 3

| | | IE |
|---|---|---|
| Loop | | |
| split | [wt.-%] | 26.5 |
| MFR$_2$ | [g/10 min] | 234 |
| XCS | [wt.-%] | 1.9 |
| Mw | [kg/mol] | 91 |
| GPR1 | | |
| split | [wt.-%] | 30 |
| MFR$_2$ of PP made in GPR1 | [g/10 min] | 90 |
| MFR$_2$ of GPR1 | [g/10 min] | 141 |
| XCS of PP made in GPR1 | [wt.-%] | 1.5 |
| XCS of GPR1 | [wt.-%] | 1.7 |
| GPR2 | | |
| split | [wt.-%] | 26.5 |
| MFR$_2$ made in GPR2 | [g/10 min] | 18 |
| MFR$_2$ of GPR2 | [g/10 min] | 74 |
| XCS of PP made in GPR2 | [wt.-%] | 2.6 |
| XCS of GPR2 | [wt.-%] | 2 |
| Mn of Matrix | | 27 |
| Mw of Matrix | | 136 |
| MWD of Matrix | | 5.1 |
| GPR3 | | |
| Split | [wt.-%] | 17 |
| MFR$_2$ of GPR3 | [g/10 min] | 31 |
| IV(AM) | [dl/g] | 2.6 |
| C2(AM) | [wt.-%] | 39 |
| C2 of GPR | [wt.-%] | 6.5 |
| XCS of GPR3 | [wt.-%] | 16.1 |

TABLE 3

Properties of the heterophasic propylene copolymers (HECO)

| | | IE | CE |
|---|---|---|---|
| MFR$_2$ | [g/10 min] | 31 | 20 |
| Tensile modulus | [MPa] | 1700 | 1300 |
| Flexural modulus | [MPa] | 1600 | — |
| Vicat B | [° C.] | 80 | — |
| NIS (23° C.) | [kJ/m$^2$] | 6.8 | 7.5 |
| NIS (−20° C.) | [kJ/m$^2$] | 3.5 | 3.5 |
| Tm | [° C.] | 165 | 163 |
| Tc | [° C.] | 129 | 127 |
| Hexane solubles | [wt.-%] | 2.3 | — |
| Scratch visibility ΔL (5N) | [—] | 0.1 | 0.2 |
| Scratch visibility ΔL (10N) | [—] | 0.4 | 0.7 |

CE is the commercial polypropylene copolymer "BF335SA" of Borealis AG

We claim:

1. An injection molded article comprising at least 60 wt.-% of a heterophasic propylene copolymer (HECO) based on the total weight of the injection molded article, said heterophasic propylene copolymer (HECO) comprising:
   (a) a matrix (M) being a polypropylene (PP), said polypropylene (PP) comprises at least three polypropylene homopolymer fractions (PP1), (PP2) and (PP3), the three polypropylene homopolymer fractions (PP1), (PP2) and (PP3) differ from each other by the melt flow rate MFR$_2$ (230° C.) measured according to ISO 1133, and
   (b) an elastomeric propylene copolymer (EC) dispersed in said matrix (M),
   wherein
   (i) said heterophasic propylene copolymer (HECO) has a melt flow rate MFR$_2$ (230° C.) measured according to ISO 1133 of equal or more than 20.0 g/10 min, and a tensile modulus of at least 1500 MPa according to ISO 527-2,
   (ii) the amorphous phase (AM) of the xylene cold soluble fraction (XCS) of the heterophasic propylene copolymer (HECO) has an intrinsic viscosity (IV) measured according to ISO 1628-1 (at 135° C. in decaline) of equal or higher than 2.0 dl/g,
   (iii) the third polypropylene homopolymer fraction (PP3) has a melt flow rate MFR$_2$ measured at 230° C. according to ISO 1133 in the range of 2.0 to 18 g/10 min, being the polyproypylene fraction with the lowest melt flow rate of the three polypropylene homopolymer fractions (PP1), (PP2) and (PP3), and
   (iv) the injection molded article is a housing having a wall thickness in the range of 0.5 to 5 mm; and
   wherein
   (1) the first polypropylene fraction (PP1) has a melt flow rate MFR$_2$ measured at 230° C. according to ISO 1133 in the range of 200 to 450 g/10 min;
   (2) the second polypropylene fraction (PP2) has a melt flow rate MFR$_2$ measured at 230° C. according to ISO 1133 in the range of 40 to 200 g/10 min
   (3) the heterophasic propylene copolymer (HECO) comprises
   3a) 80.0 to 94.0 wt.-% of the polypropylene (PP), and
   3b) 6.0 to 20.0 wt.-% of the elastomeric propylene copolymer (EC), based on the total amount of the polypropylene (PP) and the elastomeric propylene copolymer (EC); and
   (4) the polypropylene PP comprises
   4a) 20.0 to 65.0 wt.-% of the first polypropylene fraction (PP1), 4b) 20.0 to 50.0 wt.-% of the second polypropylene fraction (PP2), and
4c) 15.0 to 60.0 wt.-% of the third polypropylene fraction (PP3), based on the total amount of the first polypropylene (PP1), the second polypropylene (PP2), and the third polypropylene (PP3).

2. The injection molded article according to claim 1, wherein the polypropylene (PP) of the heterophasic propylene copolymer (HECO) has
   (a) a melt flow rate $MFR_2$ (230° C.) measured according to ISO 1133 in the range of 30.0 to 500.0 g/10 min, and/or
   (b) a molecular weight distribution (MWD) of equal or less than 8.0.

3. The injection molded article according to claim 1, wherein the polypropylene (PP) of the heterophasic propylene copolymer (HECO) has
   (a) a comonomer content equal or below 1.0 wt.-%, and/or
   (b) a xylene cold soluble (XCS) fraction measured according to ISO 6427 (23° C.) of equal or below 3.5 wt.-%.

4. The injection molded article according to claim 1, wherein each of the three polypropylene homopolymer fractions (PP1), (PP2) and (PP3) has a xylene cold soluble (XCS) content of equal or below 4.0 wt.-%.

5. The injection molded article according to claim 1, wherein the weight ratio [PP3/PP1] of the polypropylene fraction having a melt flow rate $MFR_2$ (230° C.) measured according to ISO 1133 in the range of 1.0 to 20.0 g/10 min and the polypropylene fraction having a melt flow rate $MFR_2$ (230° C.) measured according to ISO 1133 in the range of 150.0 to 500.0 g/10 min is in the range of 15/85 to 75/25.

6. The injection molded article according to claim 1, wherein
   (a) the comonomers of the elastomeric propylene copolymer (EC) are ethylene and/or at least one $C_4$ to $C_{10}$ α-olefin, and/or
   (b) the amorphous phase (AM) of the xylene cold soluble fraction (XCS) of the heterophasic propylene copolymer (HECO) has a comonomer content of below 45.0 wt.-%.

7. The injection molded article according to claim 1, wherein the heterophasic propylene copolymer (HECO) has
   (a) a comonomer content equal or below 10.0 wt.-%, and/or
   (b) a xylene cold soluble (XCS) fraction measured according to ISO6427 (23° C.) of equal or below 20.0 wt-%, and/or
   (c) hexane solubles measured according to FDA of below 3.6 wt.-%, and/or
   (d) a heat resistance measured according to Vicat B of more than 78° C.

8. The injection molded article according to claim 1, wherein the amount of the elastomeric propylene copolymer (EC) corresponds to the amount of the amorphous fraction (AM) of the xylene cold soluble (XCS) fraction.

9. The injection molded article according to claim 1, wherein the weight ratio [PP3/PP1] of the third polypropylene homopolymer fraction (PP3) and the first polypropylene homopolymer fraction (PP1) is in the range of 15/85 to 75/25.

10. An injection molded article comprising heterophasic propylene copolymer (HECO) to improve the scratch visibility of injection molded articles, said heterophasic propylene copolymer (HECO) comprising:
    (a) a matrix (M) being a polypropylene (PP), said polypropylene (PP) comprises at least three polypropylene homopolymer fractions (PP1), (PP2) and (PP3), the three polypropylene homopolymer fractions (PP1), (PP2) and (PP3) differ from each other by the melt flow rate $MFR_2$ (230° C.) measured according to ISO 1133, and
    (b) an elastomeric propylene copolymer (EC) dispersed in said matrix (M),
    wherein
    (i) said heterophasic propylene copolymer (HECO) has a melt flow rate $MFR_2$ (230° C.) measured according to ISO 1133 of equal or more than 20.0 g/10 min, and a tensile modulus of at least 1500 MPa according to ISO 527-2,
    (ii) the amorphous phase (AM) of the xylene cold soluble fraction (XCS) of the heterophasic propylene copolymer (HECO) has an intrinsic viscosity (IV) measured according to ISO 1628-1 (at 135° C. in decaline) of equal or higher than 2.0 dl/g,
    (iii) the third polypropylene homopolymer fraction (PP3) has a melt flow rate $MFR_2$ measured at 230° C. according to ISO 1133 in the range of 2.0 to 18 g/10 min, being the polyproypylene fraction with the lowest melt flow rate of the three polypropylene homopolymer fractions (PP1), (PP2) and (PP3), and
    (iv) the injection molded article is a housing having a wall thickness in the range of 0.5 to 5 mm,
    wherein
    (1) the first polypropylene fraction (PP1) has a melt flow rate $MFR_2$ measured at 230° C. according to ISO 1133 in the range of 150.0 to 200 to 450 g/10 min;
    (2) the second polypropylene fraction (PP2) has a melt flow rate $MFR_2$ measured at 230° C. according to ISO 1133 in the range of 40 to 200 g/10 min
    (3) the heterophasic propylene copolymer (HECO) comprises
    3a) 80.0 to 94.0 wt.-% of the polypropylene (PP), and
    3b) 6.0 to 20.0 wt.-% of the elastomeric propylene copolymer (EC), based on the total amount of the polypropylene (PP) and the elastomeric propylene copolymer (EC); and
    (4) the polypropylene PP comprises
    4a) 20.0 to 65.0 wt.-% of the first polypropylene fraction (PP1),
    4b) 20.0 to 50.0 wt.-% of the second polypropylene fraction (PP2), and
    4c) 15.0 to 60.0 wt.-% of the third polypropylene fraction (PP3), based on the total amount of the first polypropylene (PP1), the second polypropylene (PP2), and the third polypropylene (PP3) and
    wherein
the scratch visibility is measured on moulded plaques of 150*80*2 $mm^3$ having a high-gloss surface on which scratches were applied at a force of 10 N, the scratch visibility is reported as the difference of the luminance ΔL of the unscratched from the scratched areas.

11. The injection molded article according to claim 10, wherein the injection molded articles comprise at least 60 wt.-% of the heterophasic propylene copolymer (HECO) based on the total weight of the injection molded article.

* * * * *